Feb. 4, 1947.  J. MITCHELL ET AL  2,415,363
REFINING OF PHENOTHIAZINE
Filed June 22, 1944
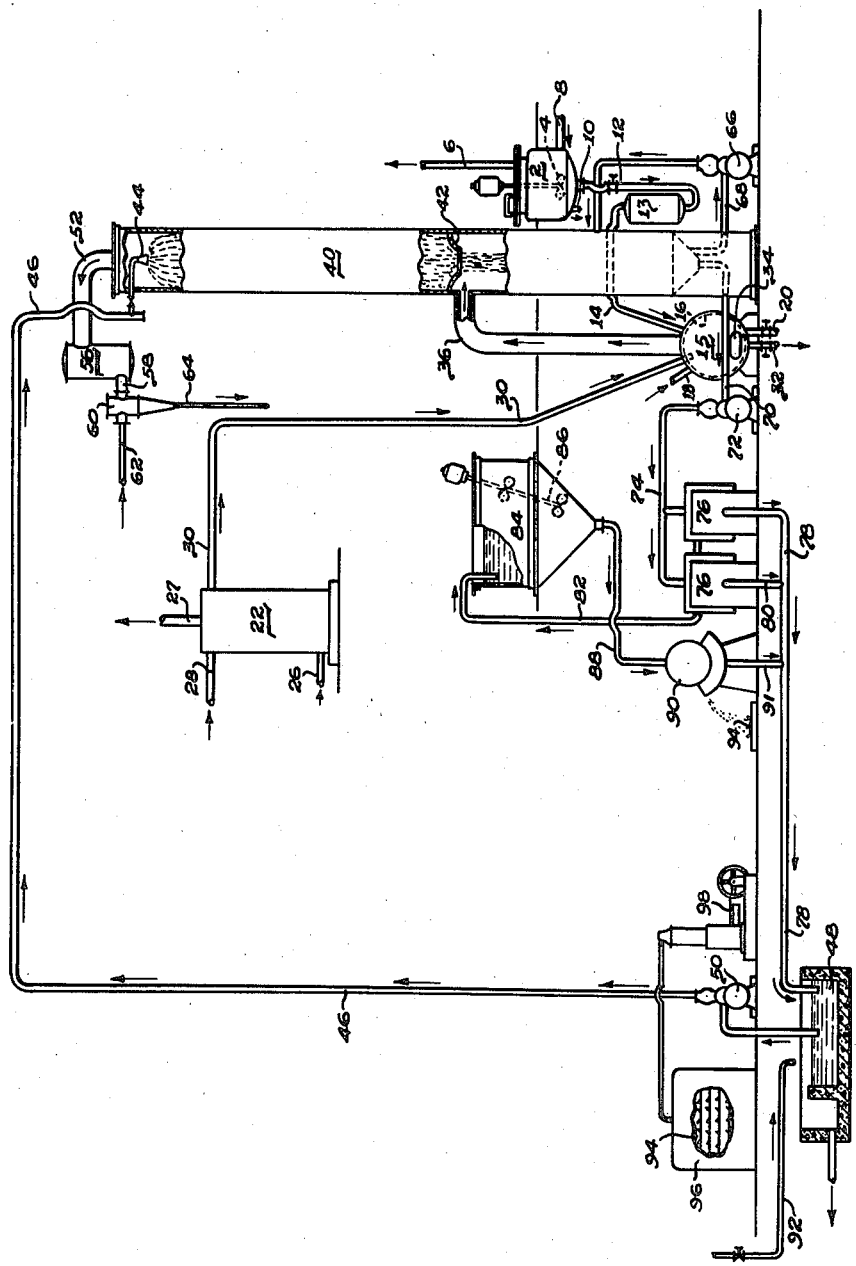
INVENTORS,
JOHN MITCHELL,
GEORGE ARTHUR WEBB.
BY Edmund G. Borden
their ATTORNEY.

Patented Feb. 4, 1947

2,415,363

UNITED STATES PATENT OFFICE 2,415,363

REFINING OF PHENOTHIAZINE

John Mitchell and George Arthur Webb, Pittsburgh, Pa., assignors, by mesne assignments, to Koppers Company, Incorporated, Pittsburgh, Pa., a corporation of Delaware Application June 22, 1944, Serial No. 541,574.

15 Claims. (Cl. 260—243)

The present invention relates to the manufacture of phenothiazine. More particularly the invention relates to the preparation of phenothiazine in a highly comminuted and purified form having improved efficacy as an agent for pest control.

Phenothiazine is a widely used anthelmintic and insecticide which has been employed with marked success in the destruction of intestinal parasites in swine, sheep, and cattle. It is considered the most nearly ideal anthelmintic yet discovered; nevertheless its therapeutic dosages are limited to a certain extent by its toxicity to some hosts.

Any improvement, therefore, in the activity of phenothiazine toward the parasite or insect without increase of toxicity to the host is especially of importance, since such increased effectiveness will, by reducing the amount which must necessarily be ingested by the host, tend greatly to increase the scope of its effective application. It has been found that the parasiticidal and insecticidal properties of a given dosage of phenothiazine increases as the particle size becomes smaller. Small particle size has been obtained in the past by pulverization, but the method is expensive and the comminution feasibly obtainable thereby is limited.

An object, therefore, of the present invention is the provision of an economical method for the production of highly comminuted, refined phenothiazine.

Another object of the invention is the provision for preparation of phenothiazine having per unit weight enhanced parasiticidal and insecticidal properties.

A further object of the present invention is the provision of method and means for the preparation of substantially colorless, pure, and uniformly finely divided phenothiazine of high melting point whereby there is enhanced not only the effectiveness of the product but also its marketability.

The invention has for further objects such other improvements and such other operative advantages or results as may be found to obtain in the processes or apparatus hereinafter described or claimed.

Briefly stated, the present invention comprises: preparing a melted mass of phenothiazine, as for example by reacting diphenylamine and sulphur in molten admixture and in the presence of a catalyst such, for example, as iodine; separating the so-formed phenothiazine from the reaction mass by its distillation, in vacuo, in the presence of a sweep vapor, for example, steam; precipitately cooling so-evolved still vapors comprising sweep vapor and phenothiazine, with an enveloping spray of cold water in multiple preponderance by weight over that of the still vapors, and thereby immediately condensing to solid phase substantially the entire phenothiazine content of the said still vapors; and thereafter separating the condensed phenothiazine from so-formed slurry and, if preferred, drying the phenothiazine product. It has been found that the thorough and immediate flooding of the phenothiazine vapor by such large quantities of water effects a "shock cooling" of the phenothiazine, which condenses vaporous phenothiazine directly to its solid phase and produces a slurry of phenothiazine and water in which the former exists as particles that are, numerically, predominantly of less than four microns in diameter.

In the accompanying drawing forming a part of this specification and showing for purposes of exemplification a preferred apparatus and method in which the invention may be embodied and practiced, but without limiting the claimed invention specifically to such illustrative instance or instances, the figure is a diagrammatic elevational view partly in vertical section of apparatus for the decolorization, steam distillation, shock condensation, filtering, and drying of phenothiazine in accordance with the present invention.

Referring now to the drawing, a reactor 2, equipped with an agitator 4 and a gas off-take pipe 6 is provided for the synthesis of phenothiazine by reaction therein of diphenylamine and sulphur in molten condition and in the presence of a catalyst, such as iodine. Care must be taken that the diphenylamine and sulphur are mixed in closely stoichiometric quantities in order that a product relatively free of products of side actions, and the like, be obtained. The said reactor 2 is jacketed and is heated by hot Dowtherm, or like heat-transfer fluid, which enters the jacket through pipe 8 and leaves through pipe 10. At the bottom of the reactor 2 is a valved and lagged drain pipe 12, through which the molten product is drained to a jacketed adsorption percolator 13. The product then flows through a pipe 14 to a jacketed steam distillation kettle 15 that is heated by Dowtherm, or the like, which flows into an annular jacket 16 through pipe 18 and therefrom through valved pipe 20.

In that modification of the invention shown in the drawing, steam is employed as the evaporative fluid for the phenothiazine in said still kettle 15 and it is superheated in a gas-fired superheater 22 having gas inlet pipe 26. The superheater has a vent 27. Steam is delivered to the said superheater 22 through pipe 28 and after being superheated flows therefrom through steam pipe 30 and into the said still kettle 15 closely adjacent the surface of the charge in the still kettle. The steam inlet pipe 30 can also be arranged so that the steam will enter at the bottom of the said kettle and pass through the still charge. The said kettle 15 is provided with a valved pipe 32 for drainage therefrom of still residue. A clean-out door 34 is provided in one end of the said still kettle 15 for the occasional removal of any solid, pitchy evaporation residue which may accumulate therein.

Vapors evolved in the still kettle 15 are delivered through lagged pipe 36, which is of relatively large diameter and which can be heated whenever atmospheric temperature is so low that too much cooling is effected in the said pipe, and flow therefrom into condensing column 40 at approximately the midpoint of the column. Within the condensing column is a co-axial, annular baffle 42 located just above the entrance of still vapors from pipe 36. This annular baffle 42 cups downwardly as shown and extends towards the center of the column for not more than about one-quarter of its diameter in order to provide passageway for water spray descending the column. The said baffle 42 prevents premature cooling of entering still vapors and consequent plugging of the vapor entrance of the condenser.

Condensing column 40 is provided with a spray nozzle 44, which is supplied with water by line 46 through which the water is pumped from a sump 48 by a pump 50.

Water vapor, or other uncondensed gases escape from the top of column 40 through vapor pipe 52, through which they flow to a separator 56 for the separation, from water vapor, of any phenothiazine which may have been carried over in the vapor stream. The fixed vapors flow under suction from the said separator 56 through pipe 58 to an eductor 60 that maintains a preferred degree of vacuum on the steam-evaporation and condensation operations. The said eductor 60 is operated by a water stream which enters the eductor through pipe 62 and is ejected therefrom and to waste disposal means in admixture with the educted vapor stream through ejector pipe 64.

A slurry of condensed phenothiazine and water is collected in the base of the condenser and is prevented from settling by its circulation by pump 66 through pipe 68 from the cone-like base of the said column to a point near the base thereof below which point slurry is temporarily stored. It has been found that a minimum of about two and one-half gallons, or about twenty pounds, of water per pound of phenothiazine in the vaporous mixture introduced into the condenser column is required to flush the condenser column free of phenothiazine and to provide a slurry which can be pumped.

The said slurry thereafter is drawn from the condenser column 40 through pipe 70 by a pump 72, and is pumped thereby through pipe 74 to filter-type thickeners 76 wherein the slurry is concentrated. The water which is separated therefrom is drained through pipes 78 and 80 into the said sump 48. The concentrated slurry is delivered by means of a pipe 82 to a slurry tank 84, wherein it is kept from settling by a stirrer 86. The said tank 84 also acts as a surge tank from which the slurry flows through a line 88 to a continuous-feed rotary filter 90. The filter 90 separates the suspended phenothiazine from more of the associated water, which water flows through drain pipes 91 and 78 to the sump 48, where it is collected for reuse. Losses of water are made up by the addition of fresh water through valved water pipe 92.

Phenothiazine is delivered continuously from the filter 90 to pans 94 which in turn are placed in a vacuum drier 96 that is held under a vacuum by pump 98 as shown.

After the phenothiazine is dried in the drier 96 it is a light-colored powdery substance which may require some sifting to remove loosely cohering lumps therefrom before being placed in packages for shipment.

The color and yield of the refined phenothiazine product of invention can be greatly improved by careful attention to the use of exact stoichiometric proportions in the reaction mixture, according to the equation:

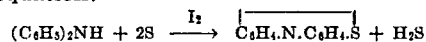

Where excess of either reactant is employed not only does the final yield decrease rapidly, but also the reaction product is darker colored than would otherwise be the case.

The color-producing material, or materials, associated with the synthesized phenothiazine is difficulty removable. Where simple vacuum distillation in the presence of a sweep-fluid is employed, color-producing material appears in the first portion of the phenothiazine distillate, possibly because of the appearance of traces of halogenated compounds in the reaction products, and there is consequently required a decolorizing treatment in order to eliminate discoloration in this first said portion and to increase the yield of pure light-yellow phenothiazine by providing means whereby the said first portion will either be produced in as light-colored form as the remainder, approximately seventy per cent, of the distillate, or whereby it will be decolorized so that it can be mixed with the said light-colored distillate. Alumina has been found effective for this purpose; it may be brought directly into contact with crude molten reaction-products of the phenothiazine synthesis as they pass through the adsorption percolator 13. Such direct treatment is especially effective in application to phenothiazine because of its low viscosity even at temperatures near its melting point.

Another manner of employing alumina contemplates its use in the kettle during distillation of the charge. After distillation has taken place, the alumina can be reactivated in situ by steaming it with superheated steam.

An additional method by which the color of phenothiazine can be improved and which can be used either in conjunction with alumina or alone, and particularly to improve the color of the said first portion of the distillate, is the use of mildly alkaline agents, or mildly reducing agents in aqueous solution as a washing medium. A mildly alkaline reagent such as sodium, potassium, or lithium carbonate is effective alone for color treatment of phenothiazine. Mildly reducing agents having the color-improving property include soluble sulphides or salts of sulphur acids in a lower form of oxidation, for example, sodium sulphide, sodium sulphite, and sodium hydrosulphite. Certain of the mildly reducing salts are also mildly alkaline in solution and thus combine the two named color improving characteristics. The use of an inorganic, water-soluble decolorizer provides a convenient means for treating phenothiazine by simply dissolving a small amount of the employed salt in the condenser water used in column 40. After this latter treatment with a decolorizing agent, the phenothiazine is carefully water washed to remove substantially all of the said agent from the phenothiazine product to hold its ash content low.

The following examples serve to illustrate the present invention.

Example No. 1

150 pounds of diphenylamine, 57 pounds of sulphur, and 0.525 pound of iodine were charged into a reaction kettle and heated therein to a temperature of 148° C. and then slowly heated to a temperature of 180° C. over a period of approximately 3½ hours. The reaction product of the described step was steam-distilled under a vacuum of 21 inches mercury by 50 pounds per hour of superheated steam at 201° C. which was passed through the molten reaction product. The temperature of the melt was 195° C. The mixed vapors of the steam distillation were flowed to a condenser column and were shock-cooled therein by water at 36° C. being delivered to the column at the rate of 162 gallons per hour. A rate of 5.35 pounds of steam per pound of phenothiazine was employed in the vaporization. A 94.9 per cent yield of finely divided phenothiazine was recovered from the aqueous condensate-slurry by filtering and tray-drying. The recovered phenothiazine had a melting point range of 185.5 to 185.9° C.

Example No. 2

A reaction mixture comprising the same reactants in the same proportions as described in Example No. 1 was maintained in molten state between a minimum temperature of 150° C. and a maximum of 190° C. for three hours. The molten reaction product was vaporized under an average vacuum of 24.3 inches mercury by passing through the molten reaction mass superheated steam at an average temperature of 217° C. and at a rate of 75 pounds of steam per hour. The temperature of the melt during vaporization was 186° C. The mixed vapors of the steam distillation were flowed to a condenser column and were shock cooled therein by water at 19° C. being delivered to the column at the rate of 218 gallons per hour, this rate representing average ratios of 24 pounds of water per pound of steam and 131 pounds of water per pound of phenothiazine. A rate of 5.4 pounds of steam per pound of phenothiazine was employed in the described vaporization.

Phenothiazine was separated from the condensate-slurry and was tray-dried. In a representative sample the relative size distribution by number of particles of the so-produced phenothiazine particles determined by microscopic inspection and the distribution by weight obtained by calculation, were as follows:

Number of particles between 0 and 4 microns in diameter_____ 831
Number of particles between 4 and 8 microns in diameter_____ 159
Number of particles between 8 and 12 microns in diameter_____ 12
Per cent by weight between 0 and 4 microns in diameter_____ 13.0
Per cent by weight between 4 and 8 microns in diameter_____ 67.4
Per cent by weight between 8 and 12 microns in diameter_____ 19.6

The average particle-mass was $0.53 \times 10^{-10}$ gram as compared with the particle-masses of products made by prior methods employing organic solvents and expensive pulverizing procedures which were found to be as follows:

Sample No. 1_____ $22.2 \times 10^{-10}$ gram
Sample No. 2_____ $34.3 \times 10^{-10}$ gram
Sample No. 3_____ $18.4 \times 10^{-10}$ gram

Example No. 3

Impure phenothiazine produced by the method described in the two preceding examples was vaporized in a vacuum of 25 inches mercury and at an average temperature of 210° C. and to a maximum temperature of 230° C. for 10¼ hours into a stream of steam impinging upon the vaporizing melt. A steam rate of 150 pounds per hour of superheated steam at a temperature of 220° C. was employed.

While vaporizing phenothiazine at a fixed relative steam rate of 10.3 pounds of steam per pound of phenothiazine, the flow-rate of condenser water was changed for each successive one-hour period, and the following ratios were obtained:

| One-hour periods | 1 | 2 | 3 | 4 |
|---|---|---|---|---|
| Condenser-water rate in gallons per hour | 313 | 288 | 266 | 217 |
| Ratio: Pounds of condenser water per pound of steam | 20.0 | 15.5 | 14.7 | 12.5 |
| Ratio: Pounds of condenser water per pound of phenothiazine | 262.8 | 222.2 | 214.1 | 175.5 |

Samples were taken of tray-dried product of each of the periods of the test and size distribution examinations by microscopic analyses were made; the distribution of particles by weight as calculated from observed particle size was as follows:

| Periods | 1 | 2 | 3 | 4 |
|---|---|---|---|---|
| Percentage by weight between 0–4 microns in diameter | | 0.2 | 6.5 | 3.7 | 1.0 |
| Percentage by weight between 4–8 microns in diameter | 52.5 | 35.0 | 24.0 | 5.4 |
| Percentage by weight between 8–12 microns in diameter | 47.3 | 50.4 | 42.5 | 10.2 |
| Percentage by weight between 12–20 microns in diameter | 0 | 8.1 | 14.0 | 22.2 |
| Percentage by weight between 20–28 microns in diameter | 0 | 0 | 15.8 | 41.5 |
| Percentage by weight between 28–36 microns in diameter | 0 | 0 | 0 | 19.7 |
| Average particle weight in grams $\times 10^{-10}$ | 0.5 | 1.0 | 1.7 | 5.9 |

It can be seen from the above tables that a rate ratio materially less than twelve pounds of water per pound of steam would be insufficient to produce the improved, highly comminuted phenothiazine of invention. A water to steam ratio by weight of about twelve will be sufficient to effect the purpose of invention, wherever, as in the present instance, the percentage of phenothiazine in the mixed vapors of steam and phenothiazine is sufficiently low that the phenothiazine exerts no great effect upon the cooling rate in the tower. In commercial practice at feasible vacuums and temperatures safely below the decomposition temperature of phenothiazine, the ratio by weight of steam to phenothiazine will seldom be less than five. If the proportion of phenothiazine in the mixed vapors of distillation should be appreciably greater than that of the above ratio, an increased condenser-water rate will be necessary to obtain the beneficial shock-cooling and consequent small particle size of invention.

Example No. 4

Impure phenothiazine was produced by reacting 150 pounds of diphenylamine with 57 pounds of sulphur in the presence of 0.525 pound of iodine. Molten reaction product, having a dark brown color, was withdrawn from the reaction kettle and treated, while in the molten state, with various proportions of Harshaw Activated Alumina. From one portion of the colored reaction product, 6 per cent by weight thereof of alumina removed 65 per cent of the colored material as determined by a Duboscq colorimeter. Ten per cent of alumina removed 95 per cent of the colored material from a second portion of the reaction product.

*Example No. 5*

A. Phenothiazine prepared in the manner described in the preceding example was steam distilled and shock-cooled according to the method of invention. The first portion of the distillate product was a dark brownish-gray. A sample of the said first portion was washed with a two per cent by weight aqueous solution of sodium carbonate. The so-treated distillate was white with a greenish cast, only slightly darker than the color of chemically pure phenothiazine, and suitable for blending with the light-colored product constituting the remainder of the distillate.

B. Another batch of phenothiazine was steam-distilled and shock-cooled in the manner hereinbefore described. Finely divided distillate comprising the first portion of the steam distillation was colored dark gray-purple. A sample of the colored first portion was washed with a two per cent by weight aqueous solution of sodium hydrosulphite. The washed product was white with a faint yellow cast, that is, substantially the color of chemically pure phenothiazine.

The invention as hereinabove set forth is embodied in particular form and manner but may be variously embodied within the scope of the claims hereinafter made.

We claim:

1. A method of producing comminuted phenothiazine, said method comprising the steps of: flowing phenothiazine from a vaporization zone therefor into a condensation zone; and, in said condensation zone shock-cooling the vaporous phenothiazine by direct contact with a large volume of cold water and thereby condensing said vaporous phenothiazine directly to its finely divided solid phase and thereby forming in said condensation zone and aqueous slurry containing at least about twenty pounds of water per pound of condensed phenothiazine.

2. A method of producing comminuted phenothiazine, said method comprising the steps of: vaporizing phenothiazine in the presence of a sweep fluid and flowing a mixture of sweep fluid and vaporous phenothiazine into a condensation zone; and, in said condensation zone shock-cooling the vaporous phenothiazine by direct contact with a large volume of cold water and thereby condensing said vaporous phenothiazine directly to its finely divided solid phase and thereby forming in said condensation zone an aqueous slurry containing at least about twenty pounds of water per pound of condensed phenothiazine.

3. A method of producing comminuted phenothiazine, said method comprising the steps of: vaporizing phenothiazine in the presence of steam and flowing a mixture of steam and vaporous phenothiazine into a condensation zone; and, in said condensation zone shock-cooling the vaporous phenothiazine by direct contact with water and thereby condensing said vaporous phenothiazine directly to its solid phase and thereby forming in said condensation zone an aqueous slurry containing at least about twenty pounds of water per pound of condensed phenothiazine.

4. A method of producing comminuted phenothiazine, said method comprising the steps of: vaporizing phenothiazine at less than atmospheric pressure in the presence of a sweep fluid and flowing a mixture of sweep fluid and vaporous phenothiazine into a condensation zone; and, in said condensation zone shock-cooling the vaporous phenothiazine by direct contact with water and thereby condensing said vaporous phenothiazine directly to its solid phase and thereby forming in said condensation zone an aqueous slurry containing at least about twenty pounds of water per pound of condensed phenothiazine.

5. A method for producing highly comminuted phenothiazine, said method comprising: vaporizing phenothiazine from a melt thereof at less than atmospheric pressure; flowing a mixture of phenothiazine vapor and a steam into a zone of condensation for the phenothiazine; shock-cooling the aforesaid mixture by direct contact with water while maintaining that proportionate ratio between liquid water and condensed phenothiazine in said condensation step which produces solid phenothiazine particles having an average weight of at most about $5.9 \times 10^{-10}$ gram.

6. A method for producing comminuted phenothiazine, said method comprising: flowing steam into contact with molten phenothiazine and thereby forming a mixture wherein steam and vaporous phenothiazine are in the ratio respectively of at least about 5 to 1 by weight; flowing the so-formed mixture into a condensation zone and bringing said mixture into contact with water and thereby cooling said mixture of steam and phenothiazine and forming in said condensation zone an aqueous slurry containing at least about twenty pounds of water per pound of condensed phenothiazine.

7. A method for producing highly comminuted phenothiazine, said method comprising: vaporizing at less than atmospheric pressure phenothiazine under partial pressure conditions and employing at least five pounds of steam per pound of phenothiazine in the said evaporation; flowing the mixed vapors from the vaporization zone into a condensation zone; in said condensation zone condensing the so-vaporized phenothiazine directly to its solid phase by shock-cooling the vapors thereof with at least twelve pounds of water per pound of steam in the mixed vapors; and separating finely divided phenothiazine from the so-formed slurry of the same.

8. A method for producing highly comminuted and refined phenothiazine, said method comprising the steps of: melting phenothiazine containing impurities present in the reaction mass of a phenothiazine synthesis; treating the phenothiazine melt with alumina; vaporizing the molten phenothiazine in the presence of a sweep fluid and flowing a mixture of sweep fluid and vaporous phenothiazine into a condensation zone; in said condensation zone shock-cooling the vaporous phenothiazine by direct contact with water and thereby condensing said vaporous phenothiazine directly to the solid phase and thereby forming in said condensation zone an aqueous slurry containing at least about twenty pounds of water per pound of phenothiazine; and separating finely divided, light-colored phenothiazine from the said aqueous slurry of the same.

9. A method for producing highly comminuted, and refined phenothiazine, said method comprising the steps of: melting phenothiazine containing impurities present in the reaction mass of a phenothiazine synthesis; treating the phenothiazine melt with alumina prior to the step of vaporizing the said phenothiazine; vaporizing the molten phenothiazine in the presence of a sweep fluid and flowing a mixture of sweep fluid and vaporous phenothiazine into a condensation zone; in said condensation zone shock-cooling the vaporous phenothiazine by direct contact with water and thereby condensing said vaporous phenothiazine directly to its solid phase and thereby forming in said condensation zone an aqueous slurry containing at least about twenty pounds of water per pound of phenothiazine; and separating finely divided, light-colored phenothiazine from the said aqueous slurry of the same.

10. A method for refining and producing highly comminuted phenothiazine, said method comprising: melting impure phenothiazine; in the presence of steam, vaporizing phenothiazine from the impure phenothiazine melt; flowing a mixture of steam and vaporized phenothiazine from the vaporization zone into a condensation zone; in said condensation zone shock-cooling the said mixture by its direct contact with water and providing thereby a condensate slurry containing at least twenty pounds of water per pound of phenothiazine; and washing phenothiazine distillate with an aqueous solution of an alkaline inorganic compound, thereby to remove associated color-producing compound from said distillate.

11. A method as claimed in claim 10 in which the inorganic alkaline compound is an alkali-metal carbonate.

12. A method as claimed in claim 10 in which the inorganic alkaline compound is sodium carbonate.

13. A method as claimed in claim 10 in which the aqueous solution is alkaline and also has reducing properties that are produced by inorganic salt dissolved therein.

14. A method for refining and producing highly comminuted phenothiazine, said method comprising: melting impure phenothiazine; in the presence of steam, vaporizing phenothiazine from the impure phenothiazine melt; flowing a mixture of steam and vaporized phenothiazine from the vaporization zone into a condensation zone; in said condensation zone shock-cooling the said mixture by its direct contact with alkaline reacting water and providing thereby a condensate slurry containing at least twenty pounds of water per pound of phenothiazine.

15. A method for refining and producing highly comminuted phenothiazine, said method comprising: melting phenothiazine containing impurities present in the reaction mass of phenothiazine synthesis; in the presence of steam vaporizing phenothiazine from the said phenothiazine melt; flowing a mixture of steam and vaporized phenothiazine from the vaporization zone into a condensation zone; in said condensation zone shock-cooling the said mixture by its direct contact with alkaline reacting water also containing a reducing agent, and providing thereby a condensate slurry containing at least twenty pounds of water per pound of phenothiazine.

JOHN MITCHELL.
GEORGE ARTHUR WEBB.

REFERENCES CITED

The following references are of record in the file of this patent:

UNITED STATES PATENTS

| Number | Name | Date |
|---|---|---|
| 2,353,292 | Britton, et al. | July 11, 1944 |
| 2,217,566 | Smith | Oct. 8, 1940 |
| 2,071,329 | Brown | Feb. 23, 1937 |
| 1,685,624 | Andrews | Sept. 25, 1928 |